United States Patent
Yoshikawa et al.

(10) Patent No.: US 7,844,689 B2
(45) Date of Patent: Nov. 30, 2010

(54) MANAGING CONFIGURATION REQUEST RECEIVED VIA NETWORK

(75) Inventors: Takashi Yoshikawa, Kanagawa (JP); Toru Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 956 days.

(21) Appl. No.: 11/335,616

(22) Filed: Jan. 20, 2006

(65) Prior Publication Data

US 2006/0190574 A1  Aug. 24, 2006

(30) Foreign Application Priority Data

Jan. 21, 2005  (JP)  ............................. 2005-014162

(51) Int. Cl.
*G06F 13/00* (2006.01)
(52) U.S. Cl. ...................... 709/221; 710/200; 710/220; 709/104
(58) Field of Classification Search ................ 709/221; 717/176, 171, 168
See application file for complete search history.

(56) References Cited

U.S. PATENT DOCUMENTS

| | | | | |
|---|---|---|---|---|
| 5,175,851 | A * | 12/1992 | Johnson et al. | 707/8 |
| 6,125,371 | A * | 9/2000 | Bohannon et al. | 707/695 |
| 6,493,826 | B1 * | 12/2002 | Schofield et al. | 726/22 |
| 6,681,392 | B1 * | 1/2004 | Henry et al. | 717/176 |
| 6,748,470 | B2 * | 6/2004 | Goldick | 710/200 |
| 6,826,570 | B1 * | 11/2004 | Eshel et al. | 707/8 |
| 7,032,003 | B1 * | 4/2006 | Shi et al. | 709/203 |
| 7,324,995 | B2 * | 1/2008 | Findleton et al. | 1/1 |
| 2002/0165929 | A1 * | 11/2002 | McLaughlin et al. | 709/213 |
| 2004/0187103 | A1 * | 9/2004 | Wickham et al. | 717/168 |
| 2004/0268114 | A1 | 12/2004 | Kobayashi | |
| 2006/0224591 | A1 * | 10/2006 | Rizzi et al. | 707/9 |
| 2009/0240781 | A1 * | 9/2009 | Otsuka | 709/208 |

FOREIGN PATENT DOCUMENTS

| | | |
|---|---|---|
| JP | 2002-163090 | 6/2002 |
| JP | 2003-069780 | 3/2003 |
| JP | 2004-104351 | 4/2004 |
| JP | 2004-164487 | 6/2004 |

OTHER PUBLICATIONS

Walter Glenn; Tony Northrup, MCSA/MCSE Self-Paced Training Kit, Jan. 12, 2005, Microsoft Press, p. 8 (with respect to the included 892 reference).*
Dave Houde, TCP/IP for Windows 2000, Jun. 7, 2001, Prentice Hall, p. 1 (of attached sheet).*
John Ray, MAC OS X Maximum Security, May 13, 2003, Sams, pp. 1-2 (892 attached).*
Kazuyoshi Tanaka, Image Forming Device, Mar. 7, 2003, Translation.*
Japanese Office Action dated Oct. 13, 2009.
Office Action dated Jan. 12, 2010 for counterpart Japanese Patent Application No. 2005-014162.

* cited by examiner

*Primary Examiner*—Ashok B Patel
*Assistant Examiner*—Andrew Goldberg
(74) *Attorney, Agent, or Firm*—Harness, Dickey & Pierce, P.L.C.

(57) ABSTRACT

An apparatus, method, system, computer program and product are disclosed, each capable of managing a configuration request received via a network. Upon receiving a configuration right request form a client, a determination is made as to whether or not a configuration right can be issued. Based on the determination, the configuration right is issued to the client.

15 Claims, 12 Drawing Sheets

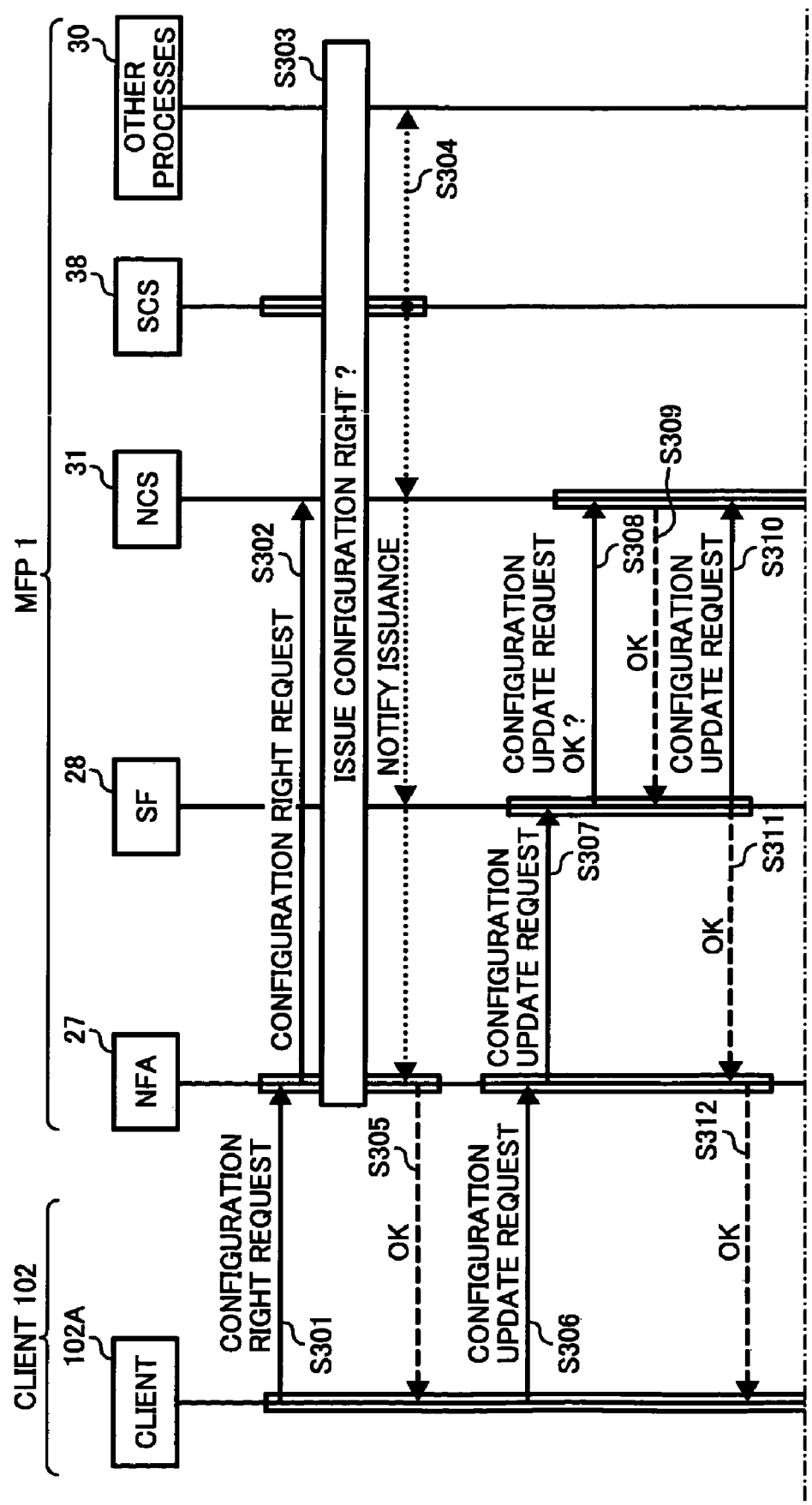

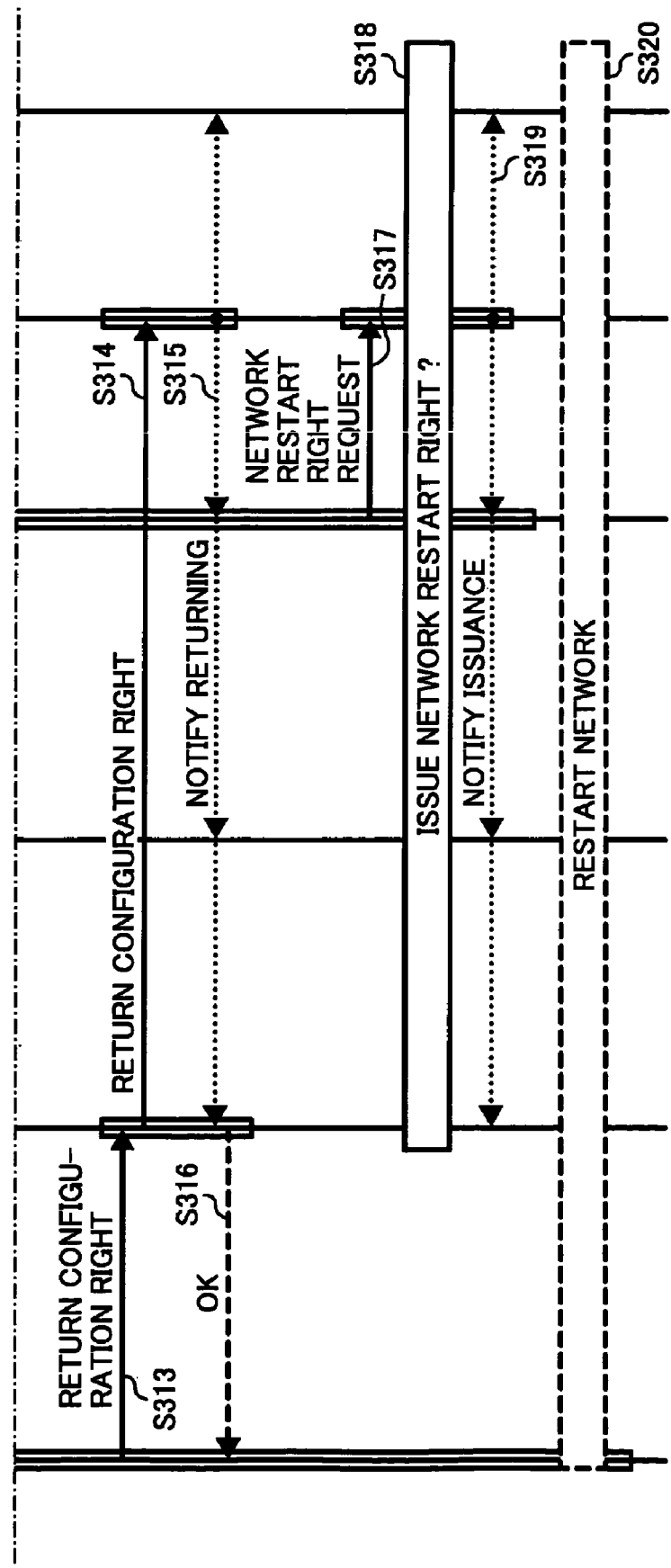

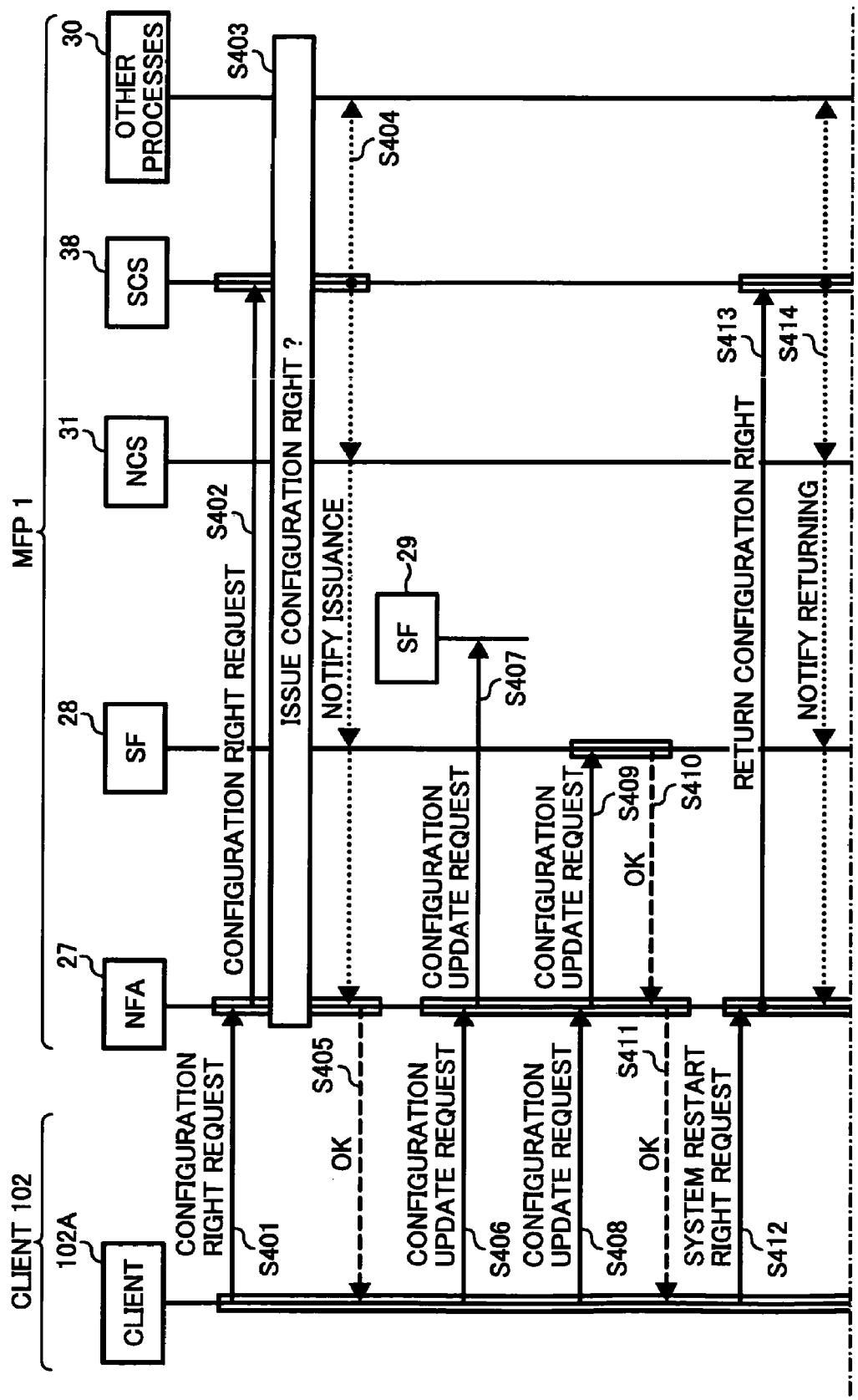

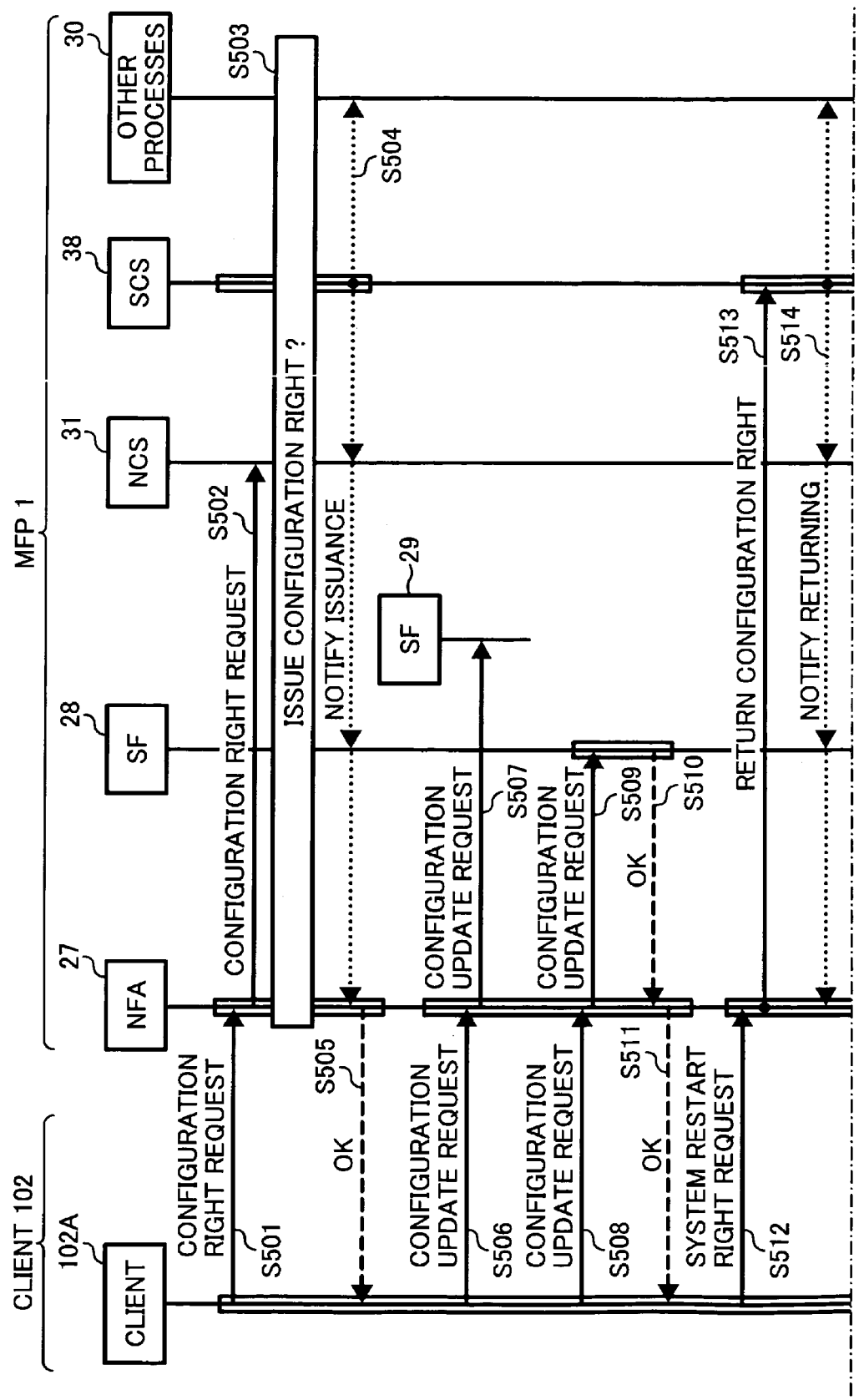

MANAGING CONFIGURATION REQUEST RECEIVED VIA NETWORK

FIELD

The following disclosure relates generally to managing a configuration request received via a network.

DESCRIPTION OF THE RELATED ART

Recently, apparatuses or devices are provided with a function of communicating with other apparatuses or devices via a network. For example, in an office environment, an image forming apparatus such as a printer or a copier may be connected to one or more terminals via the network. This allows a user to perform a function of the image forming apparatus, even when the user is located remote from the image forming apparatus as long as the user has access to one of the terminals. In addition to performing the function of the image forming apparatus, the user may be able to set the configuration of the image forming apparatus through the terminal.

However, setting the configuration of the apparatus via the network may sometimes cause a problem. For example, if more than one user tries to set the configuration of the apparatus at nearly the same time, the configuration may not be updated in a suitable manner.

SUMMARY

In light of the above and/or other problems, in one example embodiment, the present invention provides a network apparatus capable of managing a configuration request received via a network. The network apparatus includes an operation controller, which controls an operation of the network apparatus by running a plurality of processes concurrently; a network interface, which receives the configuration request from a client via the network; and a right manager, which manages a right to be issued to the client, which is related to a configuration of the network apparatus.

In one example operation, the right manager determines whether to issue a configuration right to the client upon receiving a configuration right request from the client to generate a determination result. Only when the determination result indicates to issue the configuration right, the client can set the configuration of the network apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a sequence diagram illustrating operation of managing a configuration request according to an example embodiment of the present invention;

DETAILED DESCRIPTION OF THE EXAMPLE EMBODIMENTS

Figure 1:
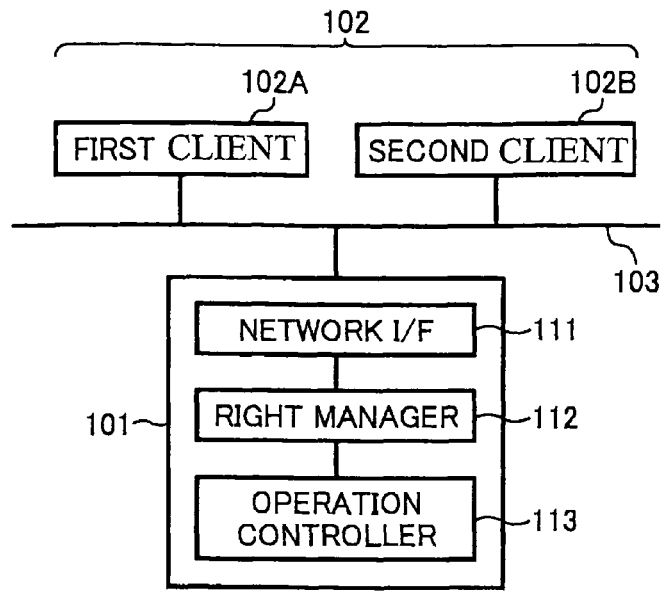
FIG. 1 is a schematic block diagram illustrating the structure of a network apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner.

Referring now to the drawings, wherein like reference numerals designate identical or corresponding parts throughout the several views, FIG. 1 illustrates a network apparatus 101 according to an example embodiment of the present invention.

As shown in FIG. 1, the network apparatus 101 is connected to a client 102 via a network 103. The client 102 includes a plurality of apparatuses, each creating a server-client system with the network apparatus 101. In this example, the client 102 is assumed to include a first client 102A and a second client 102B, each capable of setting a configuration of the network apparatus 101 via the network 103. The network 103 includes any kind of network, such as a local area network (LAN) or the Internet, for example. In addition to the network apparatus 101 and the client 102, any other kind of devices or apparatuses may be connected to the network 103.

Still referring to FIG. 1, the network apparatus 101 includes a network interface (I/F) 111, a right manager 112, and an operation controller 113. The network I/F 111 receives a configuration request from the client 102 via the network 103. The right manager 112 manages a right to be issued to the client 102, which is related to the configuration of the network apparatus 101. The operation controller 113 controls an operation of the network apparatus 101 by running a plurality of processes concurrently.

In one example operation, the first client 102A sends a configuration right request to the network I/F 111 of the network apparatus 101, which asks for issuance of a configuration right. In this example, the configuration right is an exclusive right, which excludes others from performing any operation related to the configuration of the network apparatus 101. In order to set the configuration of the network apparatus 101, the first client 102A needs to obtain the configuration right from the network apparatus 101.

Once the network I/F 111 receives the configuration right request, the right manager 112 determines whether to issue the configuration right to the first client 102A.

In one example, determination may be made based on whether the configuration right has been issued to a client other than the first client 102A. When the configuration right is issued to none of the clients, the right manager 112 generates a determination result allowing the issuance of the configuration right.

In another example, determination may be made based on whether the network apparatus 101 is available, which can be confirmed by inquiring the plurality of processes run by the operation controller 113. When the availability of the network apparatus 101 is confirmed, the right manager 112 generates a determination result allowing the issuance of the configuration right.

If the determination result indicates to issue the configuration right, the right manager 112 issues the configuration right to the first client 102A to allow the first client 102A to set the configuration of the network apparatus 101. At the same time, the right manager 112 may notify the plurality of processes that the configuration right is issued to the first client 102A.

In order to set the configuration of the network apparatus 101, the first client 102A may send a configuration update request to the network I/F 111, which is a request for updating the configuration of the network apparatus 101. The operation controller 113 updates the configuration of the network apparatus 101 according to the configuration update request. At this time, the entire or a portion of the operation controller 113 may be restarted depending on the configuration update request.

When the configuration of the network apparatus 101 is updated, the client 102A returns the configuration right to the network apparatus 101 via the network I/F 111.

Figure 2:
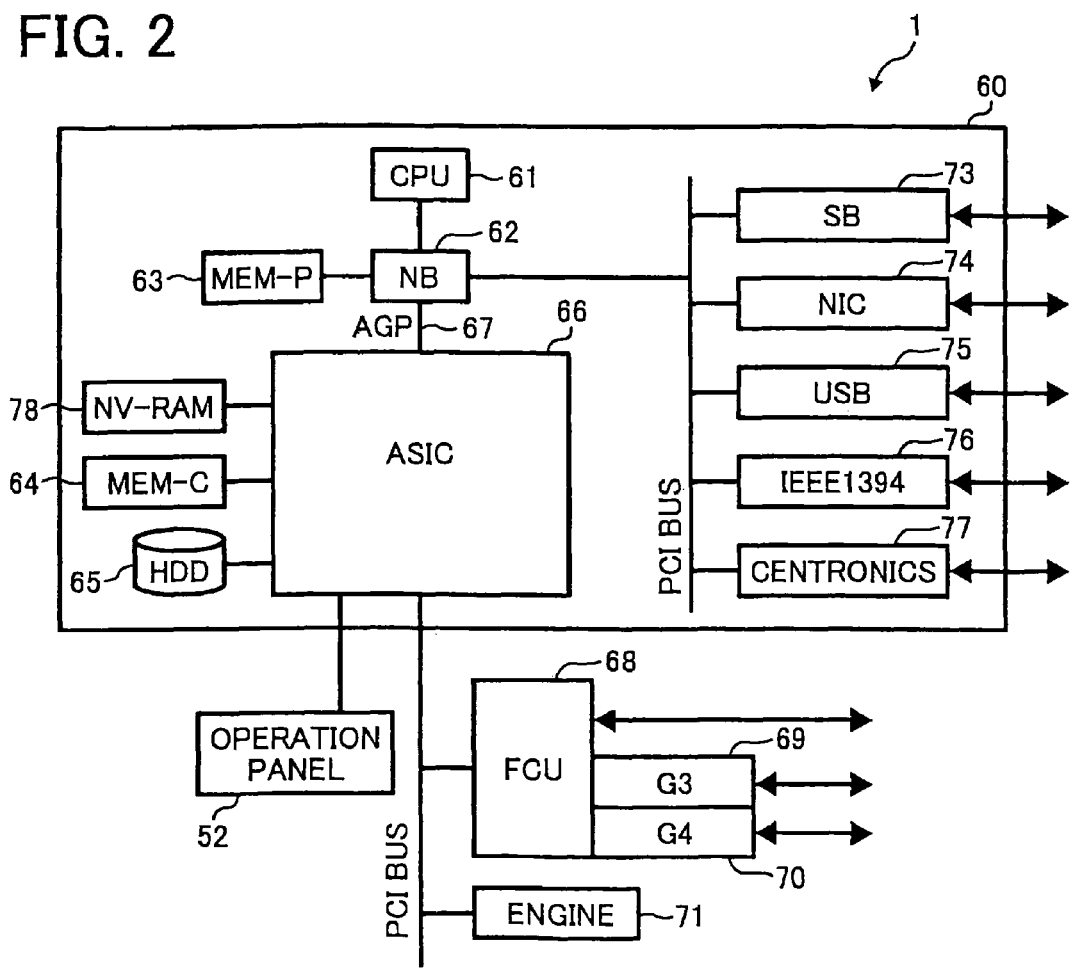
FIG. 2 is a schematic block diagram illustrating the hardware structure of a multifunctional apparatus according to an example embodiment of the present invention.

The network apparatus 101 may be implemented in various ways, for example, as a multifunctional apparatus (MFP) 1 shown in FIG. 2. The MFP 1 provides a plurality of functions including a copying function, faxing function, printing function, scanning function, function of communicating or sending data via a network ("the networking function"), etc. As shown in FIG. 2, the MFP 1 includes a control board 60, an operation panel 52, a fax control unit (FCU) 68, and an engine 71.

The control board 60 includes a central processing unit (CPU) 61, a system memory (MEM-P) 63, a local memory (MEM-C) 64, a non-volatile random access memory (NV-RAM) 78, a hard disk drive (HDD) 65, an application system integrated circuit (ASIC) 66, a north bridge (NB) 62, a south bridge (SB) 73, and various interfaces such as a network interface card (NIC) 74, a universal serial bus (USB) device 75, an IEEE 1394 device 76, and a Centronics device 77.

The CPU 61 is connected to the ASIC 66, the MEM-P 63, and the SB 73, through the NB 62. Further, the CPU 61 is connected to various interfaces through the SB 73, such as to the NIC 74, the USB device 75, the IEEE 1394 device 76, and the Centronics device 77. The ASIC 66 is connected to the operation panel 52, the NV-RAM 78, the MEM-C 64, and the HDD 65. Further, the ASIC 66 is connected to the FCU 68 and the engine 71. In this example, each connection may be made through a PCI bus. However, as illustrated in FIG. 2, the connection between the NB 62 and the ASIC 66 may be made through an Accelerated Graphics Port (AGP) 67.

Still referring to FIG. 2, the CPU 61 includes any kind of processor capable of controlling operation of the MFP 1. The MEM-P 63 includes any kind of memory, which may function as an area for deploying image data. The MEM-C 64 includes any kind of memory, which may be used as a buffer memory. The HDD 65 includes any kind of storage capable of storing a large amount of data including image data, font data, print format data, etc. The HDD 65 may additionally store a plurality of programs, which may be executed by the CPU 61.

The operation panel 52 includes any kind of user interface capable of inputting data from a user or outputting data to the user. The FCU 68 includes any kind of device capable of controlling facsimile communication. Specifically, in this example, the FCU 68 includes a G3 section in compliance with the G3 standard, and a G4 section in compliance with the G4 standard. The engine 71 corresponds to an engine section of the MFP 1, such as a scanner engine or a plotter engine, for example.

In operation, the CPU 61 loads at least one program from the HDD 65, and causes the MFP 1 to operate according to the loaded program. For example, the MFP 1 may have the software structure illustrated in FIG. 3, which includes a software resource 2, a hardware resource 4, and a starter 3.

Figure 3:
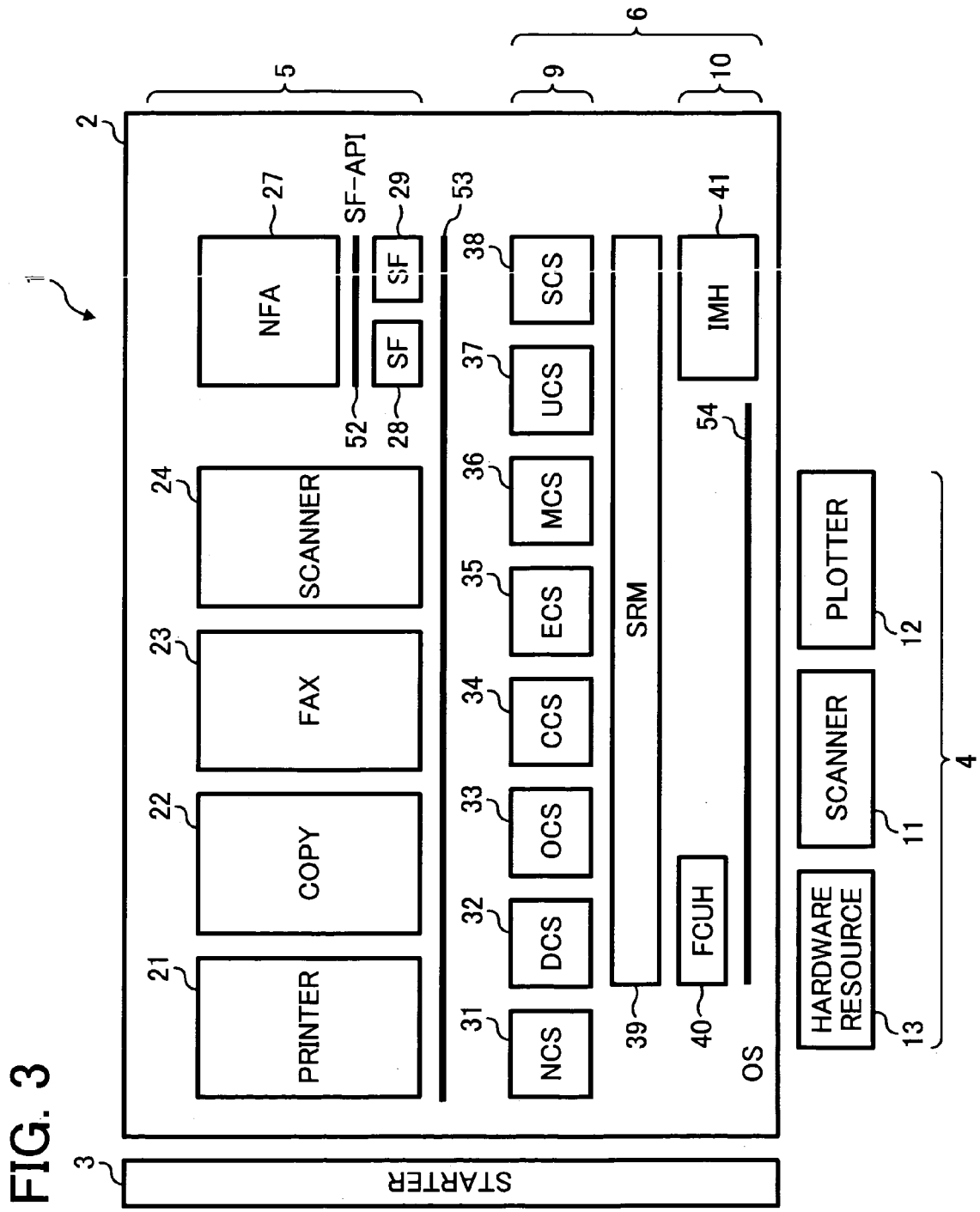
FIG. 3 is a schematic block diagram illustrating the software structure of the multifunctional apparatus shown in FIG. 2.

Referring to FIG. 3, the software resource 2 includes an application layer 5 and a platform layer 6. The application layer 5 and the platform layer 6 are run by an operating system of the MFP 1, such as UNIX, for example, to start a plurality of processes. Each of the plurality of processes may include at least one thread. The hardware resource 4 includes various components used for performing at least one of the functions of the MFP 1, such as a scanner 11, a plotter 12, and other hardware resources ("hardware resource") 13 including an auto document feeder, a sorter, a stapler, etc. In this example, the hardware resource 4 may correspond to the engine 71 of FIG. 2. The starter 3 activates the application layer 5 and the platform layer 6 when the MFP 1 is powered on, and causes the MFP 1 to operate under control of the software resource 2.

Still referring to FIG. 3, the application layer 5 of the software resource 2 provides a specific function to a user by using at least one application described below. In this example, the application layer 5 includes a printer application 21 for providing the printing function, a copy application 22 for providing the copying function, a fax application 23 for providing the faxing function, a scanner application 24 for providing the scanning function, and a network file application (NFA) 27 for providing the networking function. The application layer 5 further includes at least one standard function for providing a common function, such as a standard function (SF) 28 or 29 shown in FIG. 3. Furthermore, a standard function application program interface (SF-API) 52 may be provided to allow communication between the network application 27 and at least one of the standard functions 28 and 29.

The platform layer 6 allows a user to interact with the MFP 1, and mainly includes a control service layer 9, a system resource manager (SRM) 39, and a handler layer 10. The control service layer 9 receives a processing request from the application layer 5 via an API 53, and generates an acquisition request corresponding to the processing request using at least one service module, which will be described below. The SRM 39 and the handler layer 10 manage the hardware resource 4 according to the acquisition request.

As shown in FIG. 3, the control service layer 9 includes a plurality of service modules, such as a network control service (NCS) 31, a delivery control service (DCS) 32, an operation panel control service (OCS) 33, a certification control service (CCS) 34, an engine control service (ECS) 35, a memory control service (MCS) 36, a user information control service (UCS) 37, and a system control service (SCS) 38.

The NCS 31 allows input or output of data via the network 103. In one example, the NCS 31 provides data received from the network 103 to one of the applications 21, 22, 23, 24 and 27, using at least one protocol. In another example, the NCS 31 sends data received from one of the applications 21, 22, 23, 24, and 27 to the network, using at least one protocol. Examples of protocols include, but not limited to, HyperText Transfer Protocol (HTTP), Simple Network Management Protocol (SNMP), and Line Printer Daemon Protocol (LPD).

For example, the function of the NCS 31 may be performed by a HTTP dameon (HTTPD) capable of controlling network communication via the HTTP.

The DCS 32 controls operation related to distribution of data, which may be obtained from the HDD 65 of FIG. 2. The OCS 33 controls a user interface, such as the operation panel 52 of FIG. 2, for example. The CCS 34 controls operation related to user authentication or authorization. The ECS 35 controls an engine section of the hardware resource 4, i.e., the engine 71 of FIG. 2, such as a scanner engine of the scanner 11, a plotter engine of the plotter 12, etc. The MCS 36 controls operation related to a memory, such as acquisition, releasing or utilization of the MEM-P 63, the NV-RAM 78, the MEM-C 64, or the HDD 65 (FIG. 2). The UCS 37 controls operation related to user information. The SCS 38 controls operation related to the operating system of the MFP 1, such as management of the applications, management of the hardware resource 4, etc.

Still referring to FIG. 3, the SRM 39 controls operation related to the hardware resource 4 in cooperation with the SCS 38. For example, the SRM 39 notifies the SCS 38 of the availability of the hardware resource 4, or it manages operation of the hardware resource 4 according to the request received from the SRM 39.

The hander layer 10 includes a fax control unit handler (FCUH) 40 and an image memory handler (IMH) 41. The FCUH 40 controls operation of the FCU 68 of FIG. 2. The IMH 41 controls operation related to memory, such as allocation or management of a memory. In example operation, the SRM 39 and the FCUH 40 manages the hardware resource 4 via an engine I/F 54.

Figure 4:
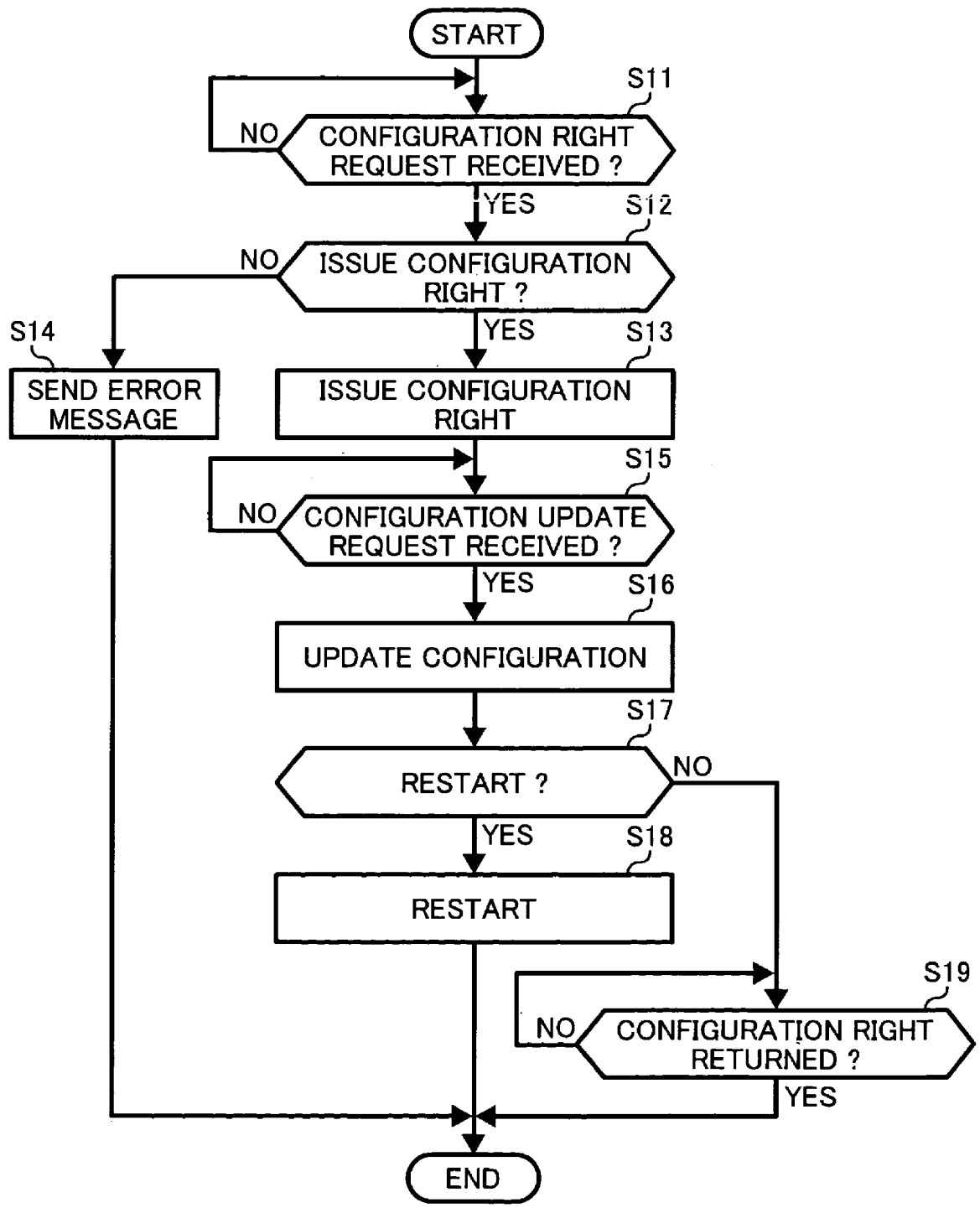
FIG. 4 is a flowchart illustrating operation of managing a configuration request according to an example embodiment of the present invention.

Referring now to FIG. 4, operation of managing a configuration request, performed by the MFP 1, is explained according to an example embodiment of the present invention. As illustrated in FIG. 1, the MFP 1 is assumed to be connected to the first and second clients 102A and 102B via the network 103. In this example, the MFP 1 performs the steps illustrated in FIG. 4 upon receiving a request from the first client 102A for starting a session. At this time, the MFP 1 may assign a session ID to the first client 102A. With this session ID, the MFP 1 can distinguish the first client 102A from other clients or apparatuses on the network 103.

Referring to FIG. 4, Step S11 determines whether a configuration right request is received from the first client 102A. If the configuration right request has been received ("YES" in Step S11), the operation proceeds to Step S12. Otherwise ("NO" in Step S11), the operation repeats Step S11.

Step S12 determines whether to issue the configuration right to the first client 102A. If it is determined to issue the configuration right ("YES" in Step S12), the operation proceeds to Step S13. If it is determined not to issue the configuration right ("NO" in Step S12), the operation proceeds to Step S14 to send an error message and ends.

In one example, the MFP 1 may check whether the configuration right has been issued to a client other than the first client 102A, such as to the second client 102B. If the configuration right has not been issued, it is determined to issue the configuration right ("YES" in Step S12). If the configuration right has been issued to the other client, it is determined not to issue the configuration right ("NO" in Step S12).

In another example, the MFP 1 may check whether the MFP 1 is available for receiving a configuration update request via the network 103. For example, if at least one of the processes executed by the MFP 1 uses data related to the configuration of the MFP 1, it is determined that the MFP 1 is not available, and the configuration right is not issued ("NO" in Step S12). Examples of such operation include, but not limited to, updating the configuration of the MFP 1 via the operation panel 52 of FIG. 2. If none of the processes executed by the MFP 1 uses data related to the configuration of the MFP 1, it is determined that the MFP 1 is available for receiving a configuration update request, and the configuration right is issued ("YES" in Step S12).

Step S13 issues the configuration right to the first client 102A. Once the configuration right is issued to the first client 102A, the configuration right is not issued to the client other than the first client 102A, such as to the second client 102B. Further, the MFP 1 may hold any one of the processes using data related to the configuration of the MFP 1. With this configuration right, the first client 102B can send a configuration update request.

Step S15 determines whether the configuration update request is received from the first client 102A. If the configuration update request is received ("YES" in Step S15), the operation proceeds to Step S16. Otherwise ("NO" in Step S15), the operation repeats Step S15.

Step S16 updates the configuration of the MFP 1 according to the configuration update request.

Step S17 determines whether to restart the operating system of the MFP 1 based on the configuration update request. If it is determined to restart the operating system of the MFP 1 ("YES" in Step S17), the operation proceeds to Step S18. Otherwise ("NO" in Step S17), the operation proceeds to Step S19.

Step S18 restarts the operating system of the MFP 1, and the operation ends. Before restarting, the configuration right, which has been issued to the first client 102A, may be returned to the MFP 1. However, after restarting of the operating system, the configuration right becomes invalid as the session between the MFP 1 and the first client 102A ends. Further, in this step, the MFP 1 may restart the entire operating system or a portion of the entire operating system, depending on the configuration update request.

Step S19 determines whether the configuration right has been returned from the first client 102A. If the configuration right is returned ("YES" in Step S19), the operation ends. Otherwise ("NO" in Step S19), the operation repeats Step S19.

The operation shown in FIG. 4 may be performed in various ways. For example, if it is determined not to issue the configuration right in Step S12 ("NO" in Step S12), the operation may repeat Step S12 for a predetermined time period, until issuance of the configuration right is allowed ("YES" in Step S12). In another example, if it is determined that the configuration right is not returned in Step S19, the operation may proceed to another step of automatically canceling the configuration right, which is issued to the first client 102A.

Figures 6, 6A, 6B:
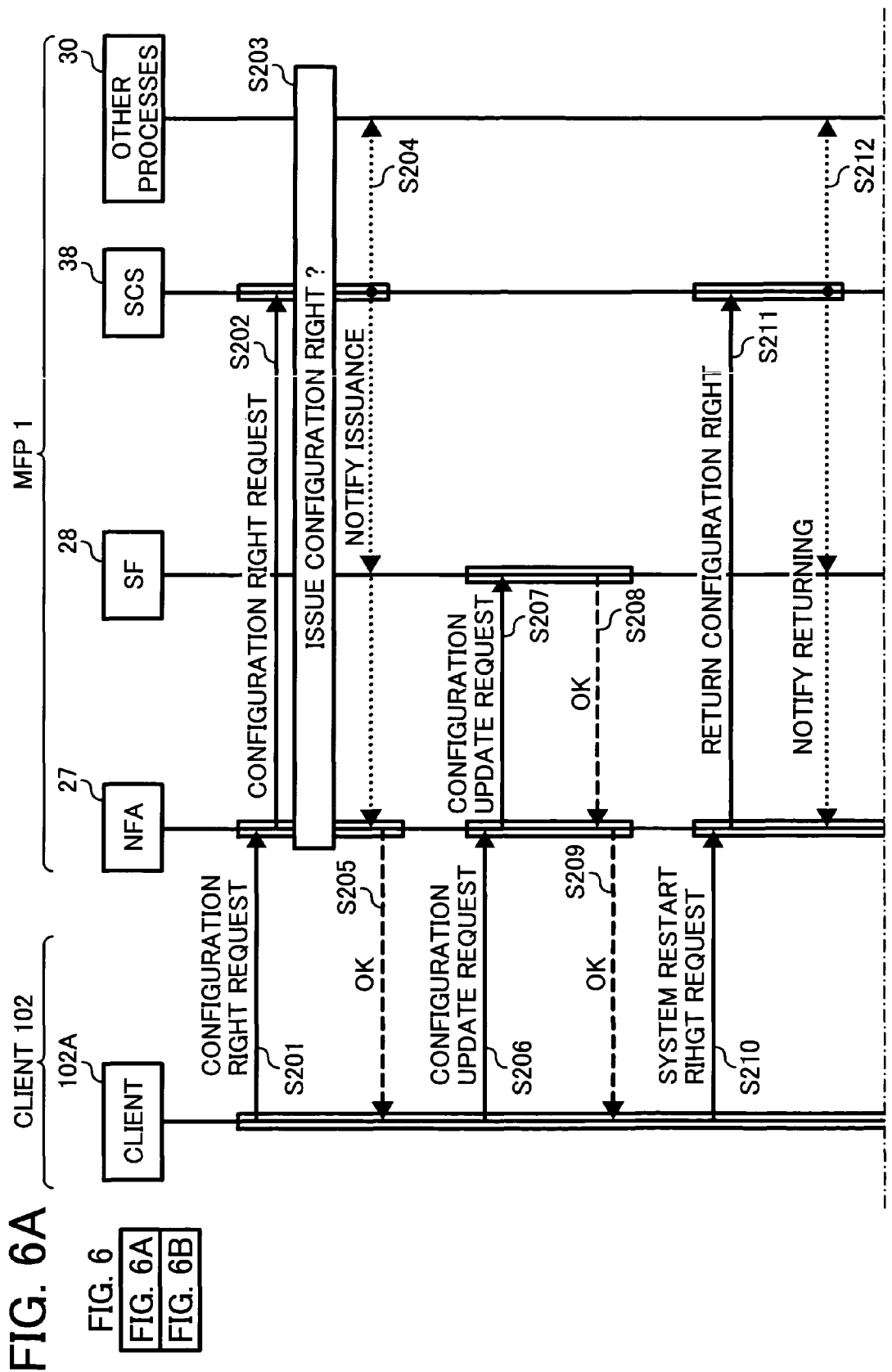
FIG. 6 is a sequence diagram illustrating operation of managing a configuration request according to an example embodiment of the present invention.
Figure 6B:
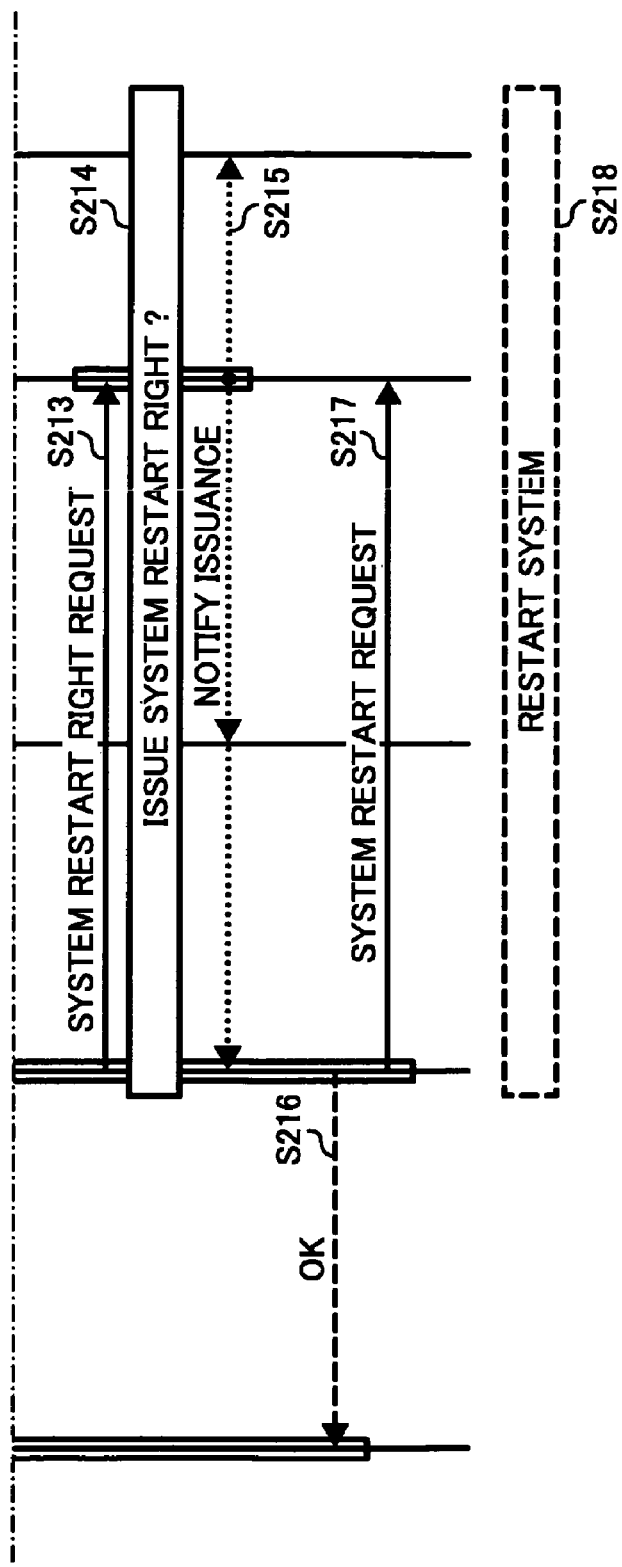
Figure 8B:
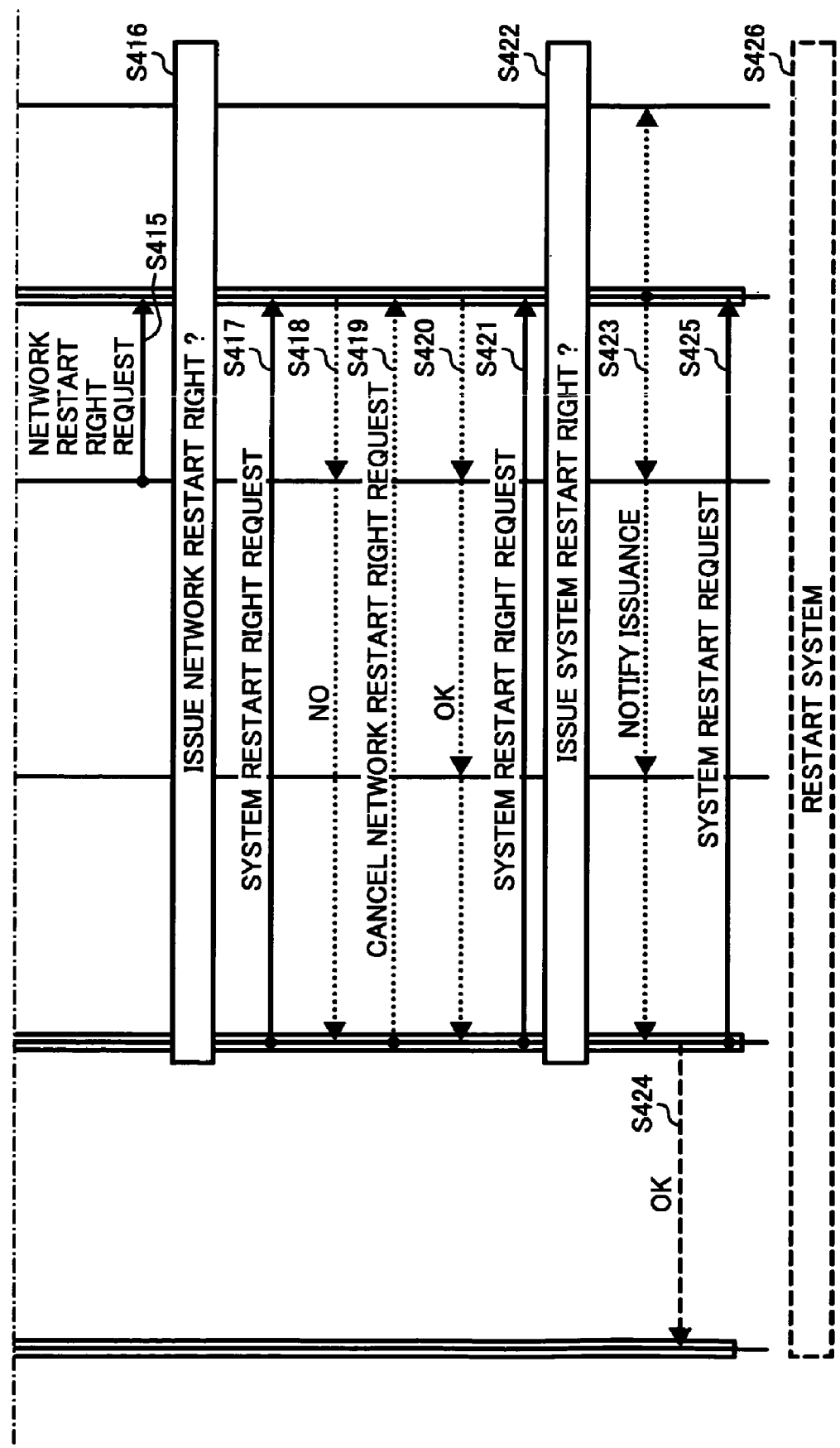
FIG. 8 is a sequence diagram illustrating operation of managing a configuration request according to an example embodiment of the present invention.
Figure 9B:
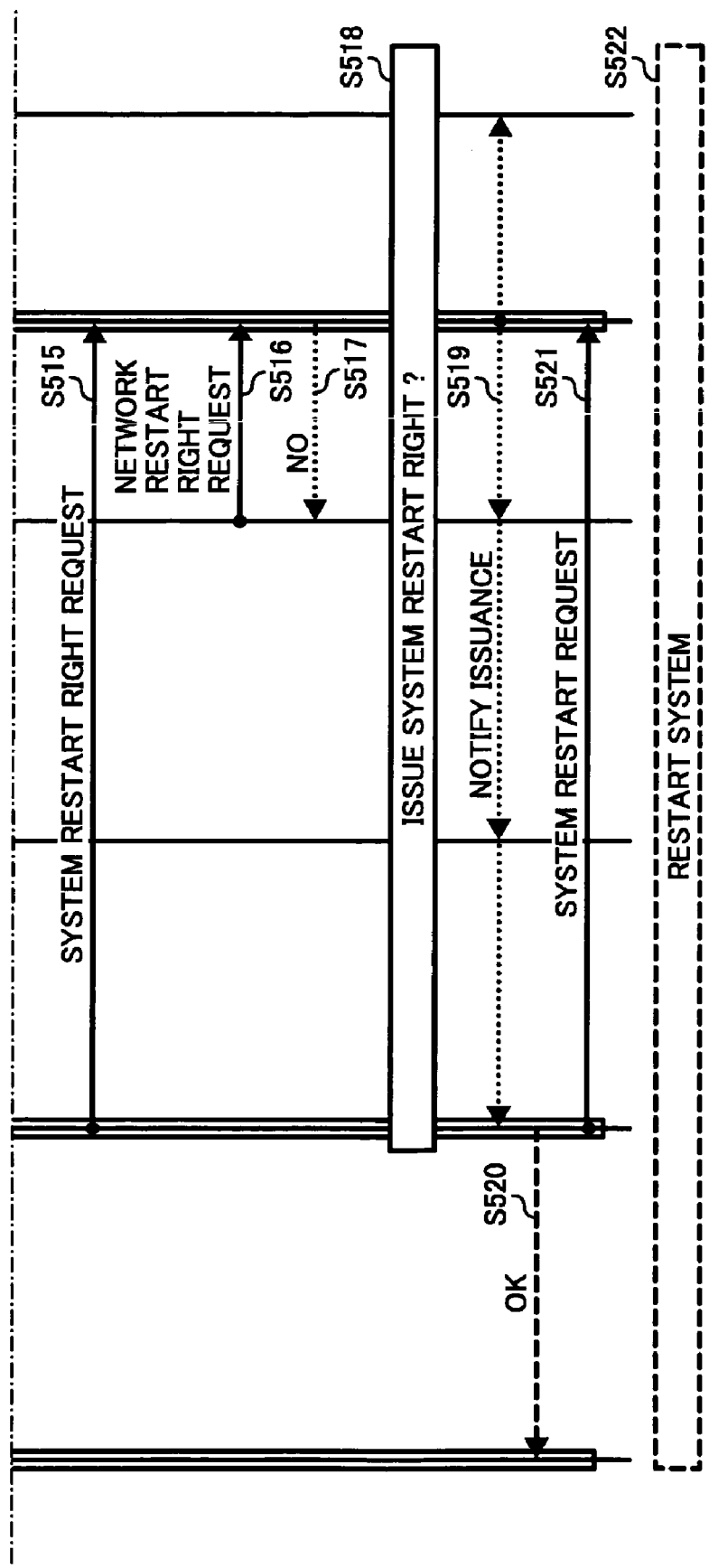
FIG. 9 is a sequence diagram illustrating operation of managing a configuration request according to an example embodiment of the present invention.

Further, Step S18 of restarting may be performed differently depending on the configuration update request received in Step S15, as illustrated in any one of FIGS. 6 to 9. More specifically, FIG. 6 illustrates an example case in which the MFP 1 receives a configuration update request, which requires restarting of the entire operating system. FIG. 7 illustrates an example case in which the MFP 1 receives a configuration update request, which requires restarting of a portion of the operating system. FIG. 8 illustrates an example case in which the MFP 1 receives a plurality of configuration update requests. FIG. 9 illustrates another example case in which the MFP 1 receives a plurality of configuration update requests.

Figure 5:
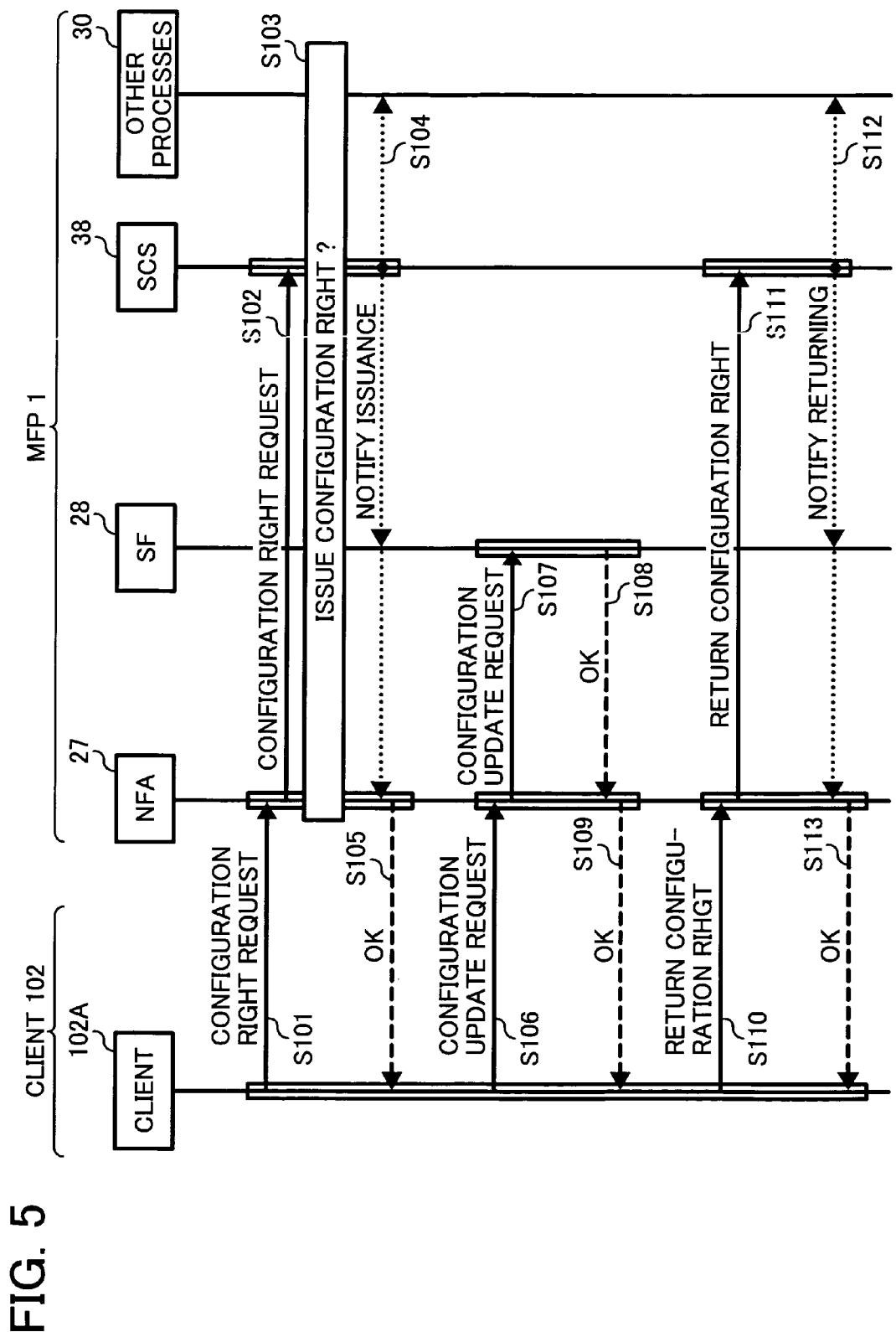
FIG. 5 is a sequence diagram illustrating operation of managing a configuration request according to an example embodiment of the present invention.

Referring now to FIG. 5, operation of managing a configuration request, performed by the MFP 1, is explained according to an example embodiment of the present invention. In this example, the MFP 1 receives a configuration update request, which requires no restarting of the operating system.

In Step S101, the first client 102A requests the MFP 1 for a configuration right, for example, by sending a configuration right request to the NFA 27 of the MFP 1.

In Step S102, the NFA 27 receives the configuration right request from the first client 102A, and notifies the SCS 38 that the configuration right request has been received.

Once notified, in Step S103, the SCS 38 determines whether to issue the configuration right to the first client 102A. In one example, the SCS 38 checks the availability of the MFP 1 by inquiring the NFA 27, the SF 28, and other processes 30 of the MFP 1. In this example, the other processes 30 correspond to a plurality of processes, which may be existed concurrently on the operating system of the MFP 1, except for the processes carried by the NFA 27, the SF 28, and the SCS 38.

Assuming that the SCS 38 determines to issue the configuration right in Step S103, the SCS 38 performs Step S104 to notify the NFA 27, the SF 28, and the other processes 30, that the configuration right is issued to the first client 102A.

Once notified, in Step S105, the NFA 27 sends a response to the first client 102A, indicating that the configuration right is issued. At this time, the response may further ask for a configuration update request.

Upon receiving the response, in Step S106, the first client 102A sends the configuration update request to the NFA 27. In this example, the first client 102A requests the MFP 1 to change a current time of the operating system, which may be displayed on the operation panel 52 of FIG. 2. The configuration update request includes a parameter value indicating the current time change.

In Step S107, the NFA 27 notifies the SF 28 that the configuration update request is received, and causes the SF 28 to update the configuration of the MFP 1 according to the configuration update request. For example, the parameter value included in the configuration update request may be stored in the SF 28. The parameter value may be used by any process executable on the operating system of the MFP 1, without restarting of the operating system.

In Step S108, the SF 28 notifies the NFA 27 that the configuration update request has been accepted.

In Step S109, the NFA 27 notifies the first client 102A that the configuration of the MFP 1 is updated according to the configuration update request. At this time, the NFA 27 may also notify whether restarting of the operating system is necessary according to the configuration update request. In this example, since updating the current time does not require the operating system to be restarted, the NFA 27 may notify that restarting is not necessary.

In Step S110, the first client 102A returns the configuration right to the NFA 27.

In Step S111, the NFA 27 notifies the SCS 38 that the configuration right is returned from the first client 102A.

Once notified, in Step S112, the SCS 38 notifies the NFA 27, the SF 28, and the other processes 30, that the configuration right is returned from the first client 102A.

In Step S113, the NFA 27 sends a response to the first client 102A, indicating that the configuration right is received.

As mentioned above, FIG. 6 illustrates the example case in which the MFP 1 receives a configuration update request, which requires restarting of the entire operating system.

In Step S201, the first client 102A sends a configuration right request to the NFA 27 of the MFP 1.

In Step S202, the NFA 27 notifies the SCS 38 that the configuration right request has been received.

In Step S203, the SCS 38 determines whether to issue the configuration right to the first client 102A in a substantially similar manner as described referring to Step S103 of FIG. 5.

Assuming that the SCS 38 determines to issue the configuration right in Step S203, the SCS 38 performs Step S204 to notify issuance of the configuration right in a substantially similar manner as described referring to Step S104 of FIG. 5.

In Step S205, the NFA 27 sends a response to the first client 102A in a substantially similar manner as described referring to Step S105 of FIG. 5.

In Step S206, the first client 102A sends a configuration update request to the NFA 27. In this example, the first client 102A requests the MFP 1 to change a time zone of the operating system, which may be displayed on the operation panel 52 of FIG. 2. The configuration update request includes a parameter value indicating the time zone change.

In Step S207, the NFA 27 notifies the SF 28 that the configuration update request is received, and causes the SF 28 to update the configuration of the MFP 1 according to the configuration update request. For example, the parameter value included in the configuration update request may be stored in the SF 28. The parameter value may be used by any process executable on the operating system of the MFP 1, after restarting of the operating system.

In Step S208, the SF 28 notifies the NFA 27 that the configuration update request has been accepted.

In Step S209, the NFA 27 notifies the first client 102A that the configuration of the MFP 1 is updated according to the configuration update request. At this time, the NFA 27 may also notify whether restarting of the operating system is necessary according to the configuration update request. In this example, since updating the time zone require the entire operating system to be restarted, the NFA 27 may notify that restarting is necessary.

In Step S210, the first client 102A requests the MFP 1 for a system restart right, for example, by sending a system restart right request to the NFA 27. The system restart right corresponds to a right issued by the MFP 1 for restarting the entire operating system of the MFP 1. At the same time, the first client 102A returns the configuration right to the NFA 27.

In Step S211, the NFA 27 notifies the SCS 38 that the configuration right is returned from the first client 102A.

Once notified, in Step S212, the SCS 38 notifies the NFA 27, the SF 28, and the other processes 30, that the configuration right is returned from the first client 102A.

In Step S213, the NFA 27 notifies the SCS 38 that the system restart right request is received from the first client 102A.

In Step S214, the SCS 38 determines whether to issue the system restart right to the first client 102A. In one example, the SCS 38 may check the availability of the MFP 1 by inquiring the NFA 27, the SF 28, and the other processes 30 of the MFP 1.

Assuming that the SCS 38 determines to issue the system restart right in Step S214, the SCS 38 performs Step S215 to notify the NFA 27, the SF 28, and the other processes 30, that the system restart right is issued to the first client 102A.

Once notified, in Step S216, the NFA 27 sends a response to the first client 102A, indicating that the system restart right is issued.

In Step S217, the NFA 27 requests the SCS 38 to restart the entire operating system of the MFP 1.

In Step S218, the SCS 38 restarts the entire operating system of the MFP 1.

In alternative to restarting the entire operating system, the MFP 1 may restart a portion of the operating system depending on a configuration update request, for example, as illustrated in FIG. 7.

In Step S301, the first client 102A sends a configuration right request to the NFA 27 of the MFP 1.

In Step S302, the NFA 27 notifies the SCS 38 that the configuration right request has been received.

In Step S303, the SCS 38 determines whether to issue the configuration right to the first client 102A. In one example, the SCS 38 checks the availability of the MFP 1 by inquiring the NFA 27, the SF 28, the NCS 31, and the other processes 30 of the MFP 1. In this example, the other processes 30 correspond to a plurality of processes, which may be existed concurrently on the operating system of the MFP 1, except for the processes carried by the NFA 27, the SF 28, the NCS 31, and the SCS 38.

Assuming that the SCS 38 determines to issue the configuration right in Step S303, the SCS 38 performs Step S304 to notify the NFA 27, the SF 28, the NCS 31, and the other processes 30, that the configuration right is issued.

In Step S305, the NFA 27 sends a response to the first client 102A indicating the issuance of the configuration right. At this time, the NFA 27 may ask for a configuration update request.

In Step S306, the first client 102A sends a configuration update request to the NFA 27. In this example, the first client 102A requests the MFP 1 to change the network configuration of the MFP 1, which may be used by any process relating to the networking function of the MFP 1, such as the configuration relating to an internet protocol (IP) address, host name, gateway, domain name system (DNS), etc. The configuration update request includes a parameter value indicating the network configuration change.

In Step S307, the NFA 27 notifies the SF 28 that the configuration update request is received.

Once notified, in Step S308, the SF 28 notifies the NCS 31 that the configuration update request is received, and asks the NCS 31 whether the network configuration, which is indicated by the configuration update request, is acceptable.

Assuming that the network configuration is acceptable, in Step S309, the NCS 31 notifies the SF 28 that that the network configuration is acceptable.

In Step S310, the SF 28 causes the NCS 31 to update the network configuration of the MFP 1. For example, the parameter value included in the configuration update request may be stored in the NCS 31. The parameter value may be used by any process executable on the operating system, after restarting a portion of the operating system relating to the network configuration ("the network portion of the operating system"), such as the NCS 31, for example.

In Step S311, the SF 28 notifies the NFA 27 that the configuration update request has been accepted.

In Step S312, the NFA 27 notifies the first client 102A that the configuration of the MFP 1 is updated according to the configuration update request.

In Step S313, the first client 102A returns the configuration right to the NFA 27.

In Step S314, the NFA 27 notifies the SCS 38 that the configuration right is returned from the first client 102A.

Once notified, in Step S315, the SCS 28 notifies the NFA 27, the SF 28, the NCS 31, the SCS 38, and the other processes 30, that the configuration right is returned from the first client 102A.

In Step S316, the NFA 27 notifies the first client 102A that the configuration right is received.

In Step S317, the NCS 31 requests the SCS 38 for a network restart right, for example, by sending a network restart right request to the SCS 38. The network restart right corresponds to a right issued by the MFP 1 for restarting the network portion of the operating system of the MFP 1.

In Step S318, the SCS 38 determines whether to issue the network restart right to the network portion of the operating system, such as to the NCS 31. In one example, the SCS 38 may check the availability of the MFP 1 by inquiring the NFA 27, the SF 28, the NCS 31, and the other processes 30 of the MFP 1.

Assuming that the SCS 38 determines to issue the network restart right in Step S318, the SCS 38 performs Step S319 to notify the NFA 27, the SF 28, the NCS 31, and the other processes 30, that the network restart right is issued.

In Step S320, the SCS 38 restarts the network portion of the operating system of the MFP 1.

As illustrated in any one of FIGS. 8 and 9, the MFP 1 may receive more than one configuration update request. FIG. 8 illustrates the example case in which the MFP 1 receives two configuration update requests; one requiring restarting of the entire operating system; and the other requiring of the network portion of the operating system.

In Step S401, the first client 102A sends a configuration right request to the NFA 27 of the MFP 1.

In Step S402, the NFA 27 notifies the SCS 38 that the configuration right request has been received.

In Step S403, the SCS 38 determines whether to issue the configuration right to the first client 102A. In one example, the SCS 38 checks the availability of the MFP 1 by inquiring the NFA 27, the SF 28, the SF 29, the NCS 31, and the other processes 30 of the MFP 1. In this example, the other processes 30 correspond to a plurality of processes, which may be existed concurrently on the operating system of the MFP 1, except for the processes carried by the NFA 27, the SF 28, the SF 29, the NCS 31, and the SCS 38.

Assuming that the SCS 38 determines to issue the configuration right in Step S403, the SCS 38 performs Step S404 to notify the NFA 27, the SF 28, the SF 29, the NCS 31, and the other processes 30, that the configuration right is issued.

In Step S405, the NFA 27 sends a response to the first client 102A indicating the issuance of the configuration right. At this time, the NFA 27 may ask for a configuration update request.

In this example, the first client 102A sends a plurality of configuration update requests, each of which is addressed to a different SF.

More specifically, in Step S406, the first client 102A sends a first configuration update request to the NFA 27, addressed to the SF 29. In Step S408, the first client 102A sends a second configuration update request to the NFA 27, addressed to the SF 28.

In Step S407, the NFA 27 notifies the SF 29 that the first configuration update request is received. In Step S409, the NFA 27 notifies the SF 28 that the second configuration update request is received.

Assuming that the second configuration update request is accepted by the SF 28, in Step S410, the SF 28 notifies the NFA 27 that the second configuration update request has been accepted. Although not shown in FIG. 8, the SF 29 also notifies the NFA 27 that the first configuration update request is accepted.

In Step S411, the NFA 27 notifies the first client 102A that the configuration of the MFP 1 is updated according to the configuration update requests. At this time, the NFA 27 may also notify whether restarting of the operating system is necessary according to the configuration update requests. This example assumes that the first configuration update request requires restarting of the network portion of the operating system, while the second configuration update request requires restarting of the entire operating system.

In Step S412, since restarting of the entire operating system is necessary, the first client 102A requests the MFP 1 for a system restart right, for example, by sending a system restart right request to the NFA 27. At this time, the first client 102A returns the configuration right to the NFA 27.

In Step S413, the NFA 27 notifies the SCS 38 that the configuration right is returned from the first client 102A.

Once notified, in Step S414, the SCS 38 notifies the NFA 27, the SF 28, the SF 29, the NCS 31, and the other processes 30, that the configuration right is returned from the first client 102A.

In Step S415, since restarting of the network portion of the operating system is necessary, the NCS 31 requests the SCS 38 for a network restart right, for example, by sending a network restart right request to the SCS 38.

In Step S416, the SCS 38 determines whether to issue the network restart right.

In Step S417, the NFA 27 sends the system restart right request to the SCS 38, which is received from the first client 102A in Step S412.

In Step S418, since the system restart right request has been received, the SCS 38 sends a response indicating that the network restart right request is rejected.

Upon receiving the response of rejection, in Step S419, the NFA 27 requests the SCS 38 to cancel the network restart right request.

In Step S420, the SCS 38 sends a response to the NFA 27, confirming the cancellation of the network restart right request.

In Step S421, the NFA 27 sends the system restart right request to the SCS 38.

In Step S422, the SCS 38 determines whether to issue the system restart right request to the first client 102A. In one example, the SCS 38 may check the availability of the MFP 1 by inquiring the NFA 27, the SF 28, the SF 29, the NCS 31, and the other processes 30 of the MFP 1.

Assuming that the SCS 38 determines to issue the system restart right in Step S422, the SCS 38 performs Step S423 to notify the NFA 27, the SF 28, the SF 29, the NCS 31, and the other processes 30, that the system restart right is issued to the first client 102A.

In Step S424, the NFA 27 sends a response to the first client 102A, indicating that the system restart right is issued.

In Step S425, the NFA 27 requests the SCS 38 to restart the entire operating system of the MFP 1.

In Step S426, the SCS 38 restart the entire operating system of the MFP 1.

As illustrated in FIG. 8, when restarting of both the entire system and a portion of the operating system is requested at substantially the same time, the MFP 1 cancels the request for restarting the portion of the operating system. FIG. 9 also illustrates the example case in which the MFP 1 receives two configuration update requests; one requiring restarting of the entire operating system; and the other requiring restarting of the network portion of the operating system. The differences include the order of processing such requests.

In Step S501, the first client 102A sends a configuration right request to the NFA 27 of the MFP 1.

In Step S502, the NFA 27 notifies the SCS 38 that the configuration right request has been received.

In Step S503, the SCS 38 determines whether to issue the configuration right to the first client 102A in a substantially similar manner as described referring to Step S403 of FIG. 8.

Assuming that the SCS 38 determines to issue the configuration right in Step S503, the SCS 38 performs Step S504 to notify issuance of the configuration right.

In Step S505, the NFA 27 sends a response to the first client 102A indicating the issuance of the configuration right. At this time, the NFA 27 may ask for a configuration update request.

In this example, the first client 102A sends a plurality of configuration update requests, each of which is addressed to a different SF.

More specifically, in Step S506, the first client 102A sends a first configuration update request to the NFA 27, addressed to the SF 29. In Step S508, the first client 102A sends a second configuration update request to the NFA 27, addressed to the SF 28.

In Step S507, the NFA 27 notifies the SF 29 that the configuration update request is received. In Step S509, the NFA 27 notifies the SF 28 that the configuration update request is received.

Assuming that the second configuration update request is accepted by the SF 28, in Step S510, the SF 28 notifies the NFA 27 that the second configuration update request has been accepted. Although not shown in FIG. 9, the SF 29 also notifies the NFA 27 that the first configuration update request has been accepted.

In Step S511, the NFA 27 notifies the first client 102A that the configuration of the MFP 1 is updated according to the configuration update requests. At this time, the NFA 27 may also notify whether restarting of the operating system is necessary according to the configuration update requests. This example assumes that the first configuration update request requires restarting of the entire operating system, while the second configuration update request requires restarting of the network portion of the operating system.

In Step S512, since restarting of the entire operating system is necessary, the first client 102A requests the MFP 1 for a system restart right, for example, by sending a system restart right request to the NFA 27. At this time, the first client 102A returns the configuration right to the NFA 27.

In Step S513, the NFA 27 notifies the SCS 38 that the configuration right is returned from the first client 102A.

Once notified, in Step S514, the SCS 38 notifies the NFA 27, the SF 28, the SF 29, the NCS 31, and the other processes 30, that the configuration right is returned from the first client 102A.

In Step S515, the NFA 27 sends the system restart right request to the SCS 38.

In Step S516, since restarting of the network portion of the operating system is necessary, the NCS 31 requests the SCS 38 for a network restart right, for example, by sending a network restart right request to the SCS 38.

In Step S517, the SCS 38 sends a response to the NCS 31, rejecting the network restart right request, as the system restart right request has been received.

In Step S518, the SCS 38 determines whether to issue the system restart right request to the first client 102A in a substantially similar manner as described referring to Step S422 of FIG. 8.

Assuming that the SCS 38 determines to issue the system restart right in Step S518, the SCS 38 performs Step S519 to notify the NFA 27, the SF 28, the SF 29, the NCS 31, and the other processes 30, that the system restart right is issued to the first client 102A.

In Step S520, the NFA 27 sends a response to the first client 102A, indicating that the system restart right is issued.

In Step S521, the NFA 27 requests the SCS 38 to restart the entire operating system of the MFP 1.

In Step S522, the SCS 38 restart the entire operating system of the MFP 1.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

This patent application is based on and claims priority under 35 U.S.C. §119 to Japanese patent application No. 2005-014162 filed Jan. 21, 2005 in the Japanese Patent Office, the entire contents of which are hereby incorporated by reference.

The invention claimed is:

1. A method for managing a configuration request, comprising:
    receiving a configuration right request from a first client via a network, which requests issuance of a configuration right for a network apparatus, wherein the configuration right allows the first client to exclude other clients from performing any operation related to a configuration of the network apparatus;
    determining whether to issue the configuration right to the first client;
    issuing the configuration right to the first client when the determining step determines to issue the configuration right to the first client; and
    allowing the first client to set the configuration of the network apparatus after issuing the configuration right to the first client,
    wherein the determining includes checking availability of the network apparatus by inquiring processes running on the network apparatus, the configuration right being issued to the first client when the availability of the network apparatus is confirmed,
    wherein the allowing includes receiving a configuration update request from the first client via the network, and updating the configuration of the network apparatus according to the configuration update request,
    wherein the configuration update request includes a first configuration update request requiring restarting of an entirety of the network apparatus, and a second configuration update request requiring restarting of a portion of the network apparatus, and
    wherein the allowing further includes canceling the second configuration update request when the first configuration update request and the second configuration update request are concurrently received,
    receiving the configuration right from the first client via the network, and
    restarting the entirety of the network apparatus according to the first configuration update request.

2. The method of claim 1, wherein the allowing further comprises:
    determining whether the configuration right is returned from the first client after the configuration of the network apparatus is updated to allow a second client of the other clients to have a configuration right.

3. The method of claim 1, wherein the allowing further comprises:
    determining whether restarting of the network apparatus is necessary based on the configuration update request; and
    restarting the network apparatus when the determining step determines that the restarting of the network apparatus is necessary.

4. The method of claim 3, wherein the restarting comprises:
    sending a response to the first client via the network, which requests the first client to return a configuration update request; and
    receiving the configuration update request from the first client via the network.

5. The method of claim 4, wherein the restarting further comprises:
    receiving a system restart right request from the first client via the network, which requests for issuance of a system restart right;
    determining whether to issue the system restart right to the first client;
    issuing the system restart right to the first client when the determining step determines to issue the system restart right to the first client; and
    allowing the first client to restart the network apparatus after issuing the system restart right to the first client.

6. The method of claim 5, wherein the system restart right issuing comprises:
    checking availability of the network apparatus, wherein the system restart right is issued to the first client when the availability of the network apparatus is confirmed.

7. The method of claim 2, wherein the allowing further comprises:
    invalidating the configuration right issued to the first client, when the determining step determines that the configuration right is not returned from the first client.

8. A network apparatus, comprising:
    an operation controller configured to control an operation of the network apparatus
    a network interface configured to receive a configuration right request from a first client via a network, which requests issuance of a configuration right for a network apparatus, wherein the configuration right allows the first client to exclude other clients from performing any operation related to a configuration of the network apparatus; and
    a right manager configured to determine whether to issue the configuration right to the first client and generate a determination result and issue a configuration right for the network apparatus to the first client based on the determination result when the configuration right request is received by the network interface,
    wherein the right manager is further configured so that determining whether to issue the configuration right to the first client includes checking availability of the network apparatus by inquiring a plurality of processes running on the network apparatus, the configuration right being issued to the first client when the availability of the network apparatus is confirmed, wherein the network apparatus is further configured to receive a configuration update request from the first client via the network, wherein the operation controller is further configured to allow the first client to set the configuration of the network apparatus after the configuration right is issued to the first client by updating the configuration of the network apparatus according to the configuration update request, wherein the configuration update request includes a first configuration update request requiring restarting of an entirety of the network apparatus, and a second configuration update request requiring restarting of a portion of the network apparatus, and wherein the operation controller is further configured to cancel the second configuration update request when the first configuration update request and the second configuration update request are concurrently received, receive the configuration right from the first client via the network, and restart the entirety of the network apparatus according to the first configuration update request.

9. The apparatus of claim 8, wherein the right manager is configured to notify the plurality of processes that the configuration right is issued to the first client.

10. The apparatus of claim 8, wherein the network interface is configured to send a response to the first client, the response requesting the configuration update request, and wherein the network interface is configured to receive the configuration update request from the first client via the network, based on the response.

11. The apparatus of claim 10, wherein the network interface is configured to receive a configuration right from the first client via the network, after the configuration of the network apparatus is set by the operation controller to allow a second client of the other clients to have a configuration right.

12. The apparatus of claim 11, wherein the right manager is configured to notify the plurality of processes that the configuration right is returned from the first client.

13. The apparatus of claim 10, wherein the right manager is configured to notify the first client whether restarting of the operation controller is necessary based on the configuration update request.

14. A multifunctional apparatus connectable to a first client via a network, comprising:

hardware configured to perform a plurality of functions; and a software resource configured to start, when executed, a plurality of processes to cause the hardware to perform at least one function of the plurality of functions, wherein upon receiving a configuration right request for the multi functional apparatus from the first client, the configuration right allowing the first client to exclude other clients from performing any operation related to a configuration of the multifunctional apparatus, the software resource is configured, together with the hardware, to determine whether to issue a configuration right to the first client in response to the configuration right request by inquiring the plurality of processes in order to check the availability of the multifunctional apparatus;

issue the configuration right to the first client when the availability of the multifunctional apparatus is confirmed;

notify the plurality of processes when the software resource determines to issue the configuration right to the first client;

send a first response to the first client, which requests for a configuration update request when the software resource determines to issue the configuration right; and set a configuration of the multifunctional apparatus according to the configuration update request received from the first client, wherein the configuration update request includes a first configuration update request requiring restarting of an entirety of the multifunctional apparatus, and a second configuration update request requiring restarting of a portion of the multifunctional apparatus, and wherein the software resource is further configured, together with the hardware to cancel the second configuration update request when the first configuration update request and the second configuration update request are concurrently received, receive the configuration right from the first client via the network, and restart the entirety of the multifunctional apparatus according to the first configuration update request.

15. The apparatus of claim 14, wherein the software resource is further configured to:

send a second response to the first client, which requests for returning of the configuration right after the configuration of the multifunctional apparatus is set.

* * * * *